(12) United States Patent
Block

(10) Patent No.: US 10,237,403 B2
(45) Date of Patent: Mar. 19, 2019

(54) COMMUNICATION BLOCKING SYSTEM AND METHOD

(71) Applicant: Mark Stephen Block, Cordova, TN (US)

(72) Inventor: Mark Stephen Block, Cordova, TN (US)

( * ) Notice: Subject to any disclaimer, the term of this patent is extended or adjusted under 35 U.S.C. 154(b) by 0 days.

(21) Appl. No.: 15/165,481

(22) Filed: May 26, 2016

(65) Prior Publication Data

US 2016/0360035 A1    Dec. 8, 2016

Related U.S. Application Data

(60) Provisional application No. 62/172,307, filed on Jun. 8, 2015.

(51) Int. Cl.
    *H04M 3/42* (2006.01)
    *H04M 3/436* (2006.01)
    *H04W 4/20* (2018.01)
    *H04M 7/00* (2006.01)

(52) U.S. Cl.
    CPC ....... *H04M 3/436* (2013.01); *H04M 3/42153* (2013.01); *H04W 4/20* (2013.01); *H04M 3/42068* (2013.01); *H04M 3/42382* (2013.01); *H04M 7/0033* (2013.01); *H04M 2201/18* (2013.01)

(58) Field of Classification Search
    CPC ............. H04M 3/436; H04M 3/42068; H04M 3/42153; H04M 7/0033; H04M 1/57; H04M 1/575; H04M 1/72519; H04M 2207/18; H04M 3/42042; H04M 2201/18; H04M 2203/556; H04M 3/2218; H04M 3/4365; H04W 4/20
    USPC .......... 455/415; 379/142.02, 142.06, 207.02, 379/207.15, 210.02, 211.01, 211.02, 379/88.19, 88.2, 88.21
    See application file for complete search history.

(56) References Cited

U.S. PATENT DOCUMENTS

| | | | | |
|---|---|---|---|---|
| 2004/0114747 | A1* | 6/2004 | Trandal | H04M 3/436 379/211.02 |
| 2006/0182029 | A1* | 8/2006 | Kealy | H04L 12/585 370/230 |
| 2006/0291641 | A1* | 12/2006 | Barclay | H04M 3/436 379/211.03 |
| 2008/0097845 | A1* | 4/2008 | Altberg | G06Q 30/02 705/14.61 |
| 2008/0139230 | A1* | 6/2008 | Mottes | H04M 3/42059 455/466 |
| 2012/0015639 | A1* | 1/2012 | Trivi | H04M 3/436 455/415 |

(Continued)

*Primary Examiner* — Justin Y Lee
*Assistant Examiner* — B M M Hannan
(74) *Attorney, Agent, or Firm* — Dunlap Bennett & Ludwig PLLC; Brendan E. Squire

(57) ABSTRACT

A system and method of blocking a telecommunication is provided. The present invention may include a network of subscribers in communication with a server. The server is able to count an amount of times a third party attempts a telecommunication with one of its subscribers. Each subscriber may set threshold amount of telecommunications. Once the third party has reached the threshold amount of telecommunications, the telecommunication attempt is blocked from reaching additional subscribers.

13 Claims, 3 Drawing Sheets

(56) References Cited

U.S. PATENT DOCUMENTS

| | | | | |
|---|---|---|---|---|
| 2014/0128047 A1* | 5/2014 | Edwards | ............... | H04L 51/12 |
| | | | | 455/415 |
| 2014/0219430 A1* | 8/2014 | Daniel | ............... | H04M 3/436 |
| | | | | 379/142.05 |
| 2015/0078538 A1* | 3/2015 | Jain | ............... | H04M 3/493 |
| | | | | 379/88.01 |
| 2015/0103990 A1* | 4/2015 | Lee | ............... | H04M 3/436 |
| | | | | 379/201.02 |
| 2015/0189082 A1* | 7/2015 | Pfeffer | ............... | H04M 3/436 |
| | | | | 379/142.09 |
| 2015/0249737 A1* | 9/2015 | Spievak | ............... | H04M 3/436 |
| | | | | 379/189 |
| 2015/0350399 A1* | 12/2015 | Feller | ............... | H04M 1/665 |
| | | | | 455/414.1 |
| 2016/0029188 A1* | 1/2016 | Joels | ............... | H04W 4/16 |
| | | | | 455/414.1 |
| 2016/0142540 A1* | 5/2016 | Hickey | ............... | H04M 3/436 |
| | | | | 379/210.02 |
| 2016/0360036 A1* | 12/2016 | Ansari | ............... | H04M 3/436 |

* cited by examiner

COMMUNICATION BLOCKING SYSTEM AND METHOD

CROSS-REFERENCE TO RELATED APPLICATION

This application claims the benefit of priority of U.S. provisional application No. 62/172,307, filed Jun. 8, 2015, the contents of which are herein incorporated by reference.

BACKGROUND OF THE INVENTION

The present invention relates to blocking communications and, more particularly, to a communication blocking software to block calls, emails and texts from telemarketers.

Telemarketing is a form of direct marketing in which a consultant using the telephone or any other means of communication to contact potential clients and market products and services. Potential customers are identified and classified by various means such as purchase history, surveys earlier, participation in contests or job applications. Names may also be purchased from the database of another company or obtained from the phonebook or other public or private list. Telemarketing, whether by phone, email or text, can be an annoyance. Telemarketers may contact the same potential clients over and over again. Current blocking programs fail to properly block the telemarketers from continuing communication.

As can be seen, there is a need for system and method that prevents telemarketers from continued communication.

SUMMARY OF THE INVENTION

In one aspect of the present invention, a method of blocking a telecommunication comprises: providing a software run on a computer of a subscriber, wherein the computer comprises a microprocessor and a memory; receiving a telecommunication at the computer via a telecommunications network from a third party, wherein data of the third party is stored on the memory of the computer; transmitting the data from the computer to a server comprising a microprocessor and a memory, wherein the microprocessor of the server stores the data of the third party on the memory of the server; matches the data of the third party from the computer of the subscriber with other data of the third party received from other computers of other subscribers; counts a total amount of telecommunications the third party has made to subscribers; and transmits the total amount of telecommunications to the computer of the subscriber, wherein the microprocessor of the computer compares the total amount of telecommunications with a threshold amount; and conveys the telecommunication to the subscriber if the total amount is equal to or below the threshold amount, or blocks the telecommunication if the total amount is above the threshold amount.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes at least one computer having a microprocessor, memory and a user interface. The computer may include any type of computer such as, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The present invention includes a software application that counts communications and allows the user of the software to block these communications based on the number of communication attempts made by the communication originator. The communications may be phone calls, texts, and emails. The person receiving the phone calls can set a threshold amount based on the number of calls the originator makes so that the received calls after that threshold is reached are blocked. The present invention counts calls from the receiving end of the communication and allows the customer to control the amount of protection they get.

Figure 1:
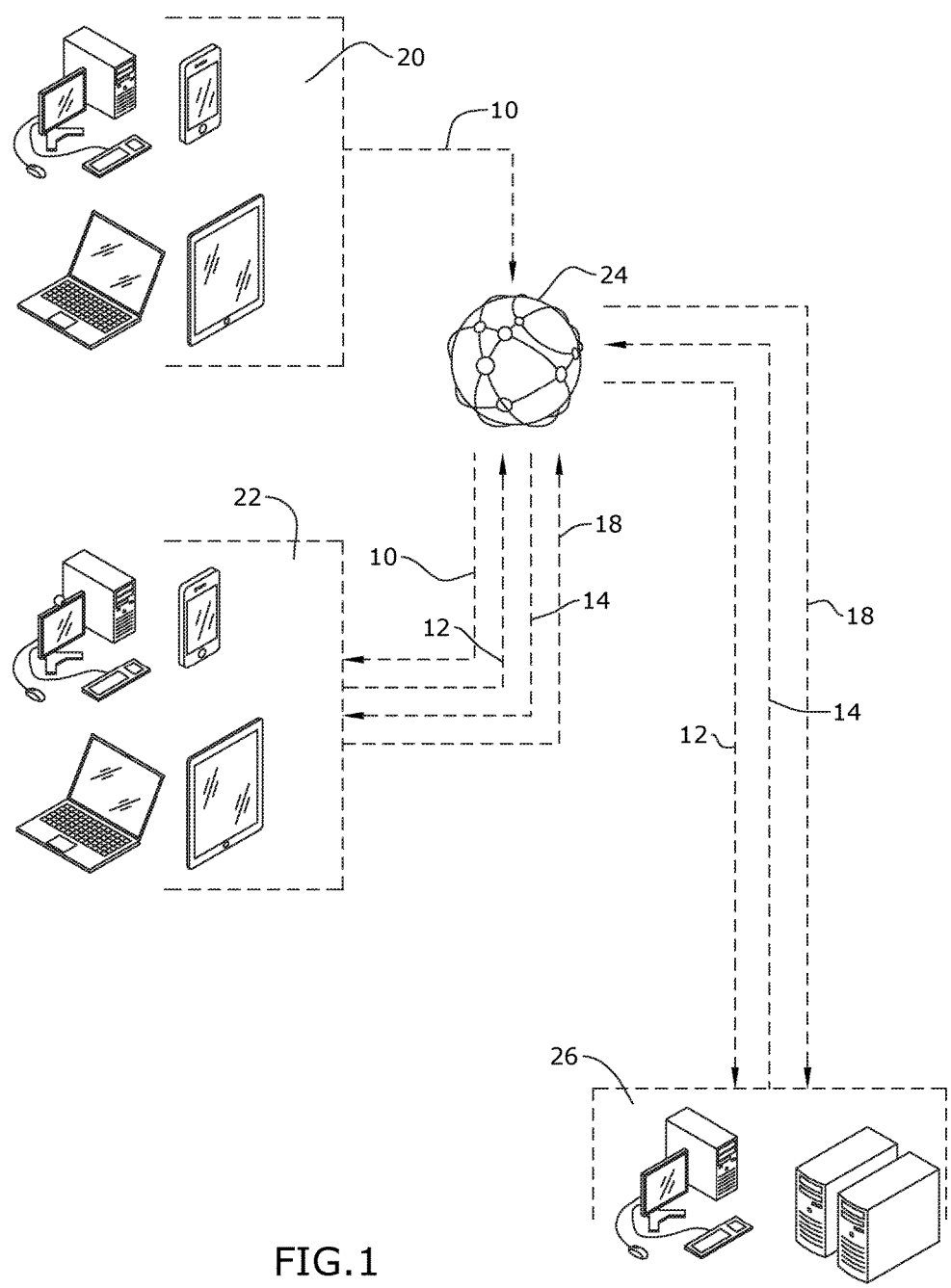
FIG. 1 is a schematic view of an embodiment of the present invention.
Figure 2:
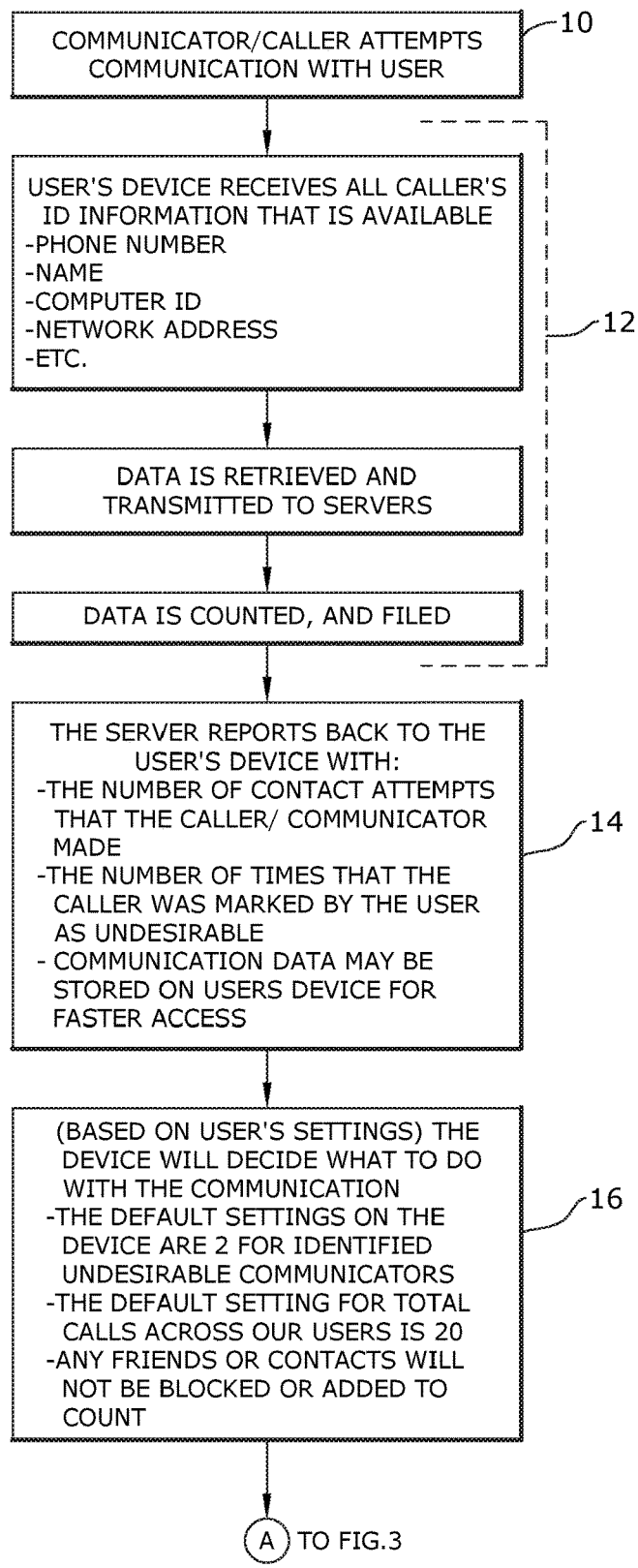
FIG. 2 is a flow chart of the method steps of an embodiment of the present invention.
Figure 3:
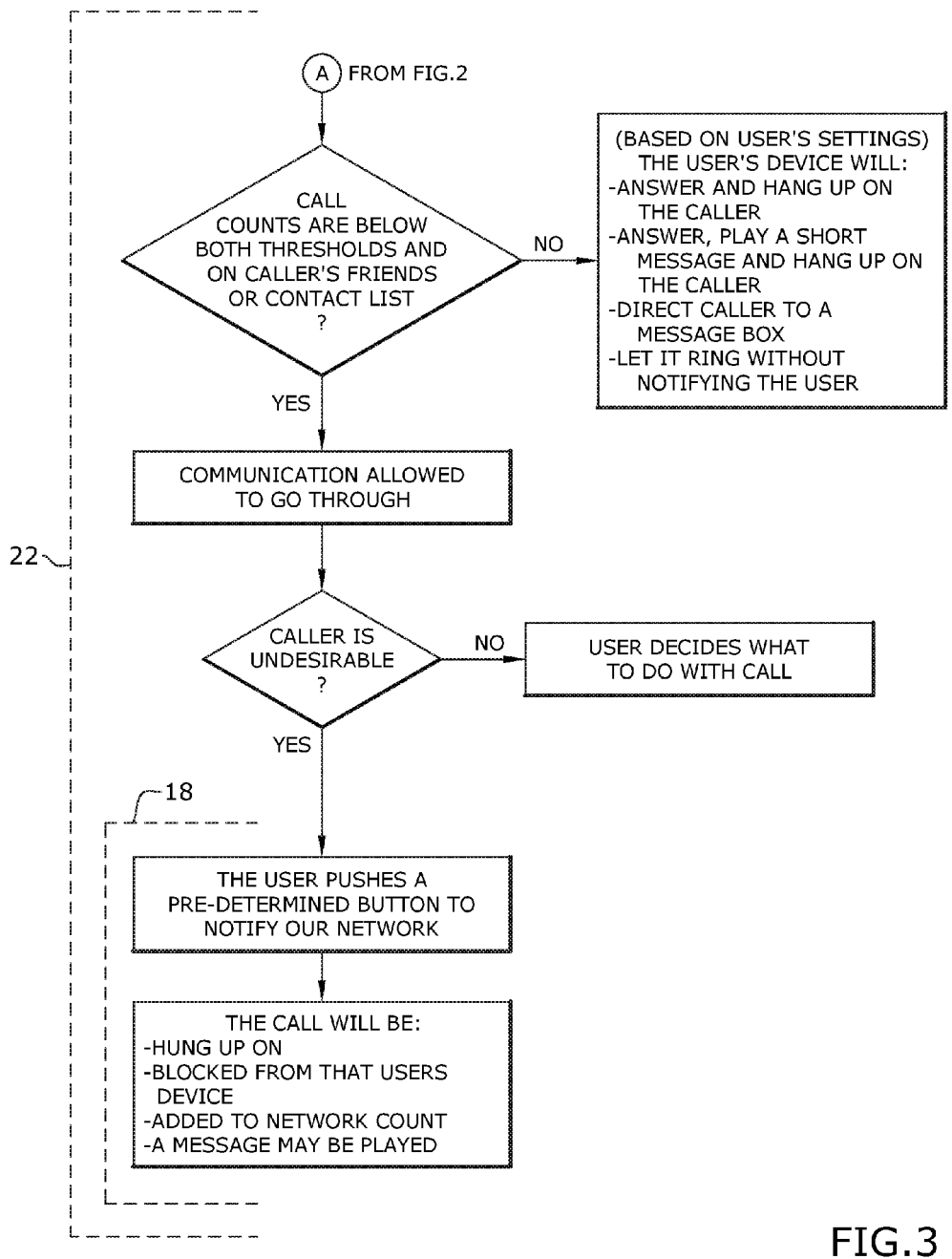
FIG. 3 is a continuation of the flow chart of FIG. 2.

Referring to FIGS. 1 through 3, the present invention includes a system and method of blocking a telecommunication from reaching a majority of subscribers. The present invention may include a network of subscribers in communication with a server. The server is able to count an amount of times a third party 20 attempts a telecommunication with one of its subscribers. Each subscriber may set threshold amount of telecommunications. Once the third party 20 has reached the threshold amount of telecommunications within a certain time frame, the telecommunication attempt is blocked from reaching additional subscribers. Therefore, as opposed to receiving a call and then adding the call to a list, the present invention determines who an undesirable caller is prior to a majority of the subscribers being contacted by the undesirable caller.

A software is run on a computer 22 of a subscriber. The computer 22 includes a microprocessor and a memory. The computer 22 receives a telecommunication 10 via a telecommunications network 24 from a third party 20. Data 12 of the third party 20 is store on the memory of the computer 22. The data 12 may be in the form of a phone number, a name, a computer identification, a network address and the like. The data 12 is transmitted from the computer 22 to a server 26. The server 26 includes a microprocessor and a memory. The microprocessor of the server 26 stores the data 12 of the third party 20 on the memory of the server, matches the data 12 of the third party 20 from the computer of the subscriber 22 with other data of the third party received from other computers of other subscribers, counts a total amount of telecommunications 14 the third party 20 has made to subscribers and transmits the total amount of telecommunications 14 to the computer 22 of the subscriber. The microprocessor of the computer 22 compares the total amount of telecommunications 14 with a threshold amount 16 and conveys the telecommunication 10 to the subscriber if the total amount is below the threshold amount 16, or blocks the telecommunication 10 if the total amount is above the threshold amount 16.

The telecommunication 10 of the present invention may be at least one of a telephone call, an email and a text message. For example, if the telecommunication 10 is a telephone call, the computer 22 may be operatively connected to a subscriber phone. In certain embodiments, the computer 22 and the subscriber phone are part of a mobile device and the software is a blocking application provided for installation on the mobile device. In such embodiments, the telecommunications network 24 is a wireless telecommunications network and the step of transmitting the data 12 from the computer 22 to a server 26 is performed over the wireless telecommunications network. Further, the microprocessor of the server 26 transmits the total amount of telecommunications 14 to the computer 22 of the subscriber over the wireless telecommunications network.

In certain embodiments, the present invention may include multiple methods of blocking a telecommunication 10 from a third party 20. If the telecommunication 10 goes through, the microprocessor of the computer 22 prompts the subscriber to communicate 18 whether the telecommunication is from a desired third party or an undesired third party. The communications 18 is transferred to the server 26. The microprocessor of the server counts a total amount of times the third party 20 has been communicated as undesirable from subscribers. If the third party 20 attempts to telecommunicate with a second subscriber, the server 26 transmits the total amount of times 14 the third party 20 has been communicated 18 as undesirable to a second computer of the second subscriber. The microprocessor of the second computer compares the total amount of times the third party 20 has been communicated as undesirable to a second threshold amount 16 and conveys the telecommunication 10 to a second subscriber if the total amount is equal to or below the second threshold amount 16, or blocks the telecommunication if the total amount is above the second threshold amount 16.

The subscribers of the present invention may set the threshold number 16 of both the threshold amount 16 of overall third parties and the second threshold amount 16 of third parties marked as undesirable. The threshold amounts 16 are saved on the memory of the computer 22. For example, the subscriber may use the blocking application loaded on their mobile device to set the threshold amount 16. Further, an amount of time the threshold amount 16 is reached may either be preset or set by the subscriber. Therefore, if the threshold amount 16 is reached within the certain amount of time, than the telecommunication is blocked. If the threshold amount 16 is not reach within the certain amount of time, the time restarts and the count restarts.

The following is an example of the present invention in use. A third party makes 100 phone calls to subscribers with the software of the present invention. The subscriber of the software has his call threshold set at 10. Therefore, if the third party dials the subscriber in the first 10 calls the call would go through. However, if the third party dials the subscriber at the $11^{th}$ to $100^{th}$ call, the call would be blocked. Also the present invention may include a selection which, if the call gets through, the subscriber can select to notify the network that this is an undesirable caller and could be blocked by a much lower separate threshold in the set on the phone. The call counters may be on a loop and update to keep the system constantly fresh and viable information.

It should be understood, of course, that the foregoing relates to exemplary embodiments of the invention and that modifications may be made without departing from the spirit and scope of the invention as set forth in the following claims.

What is claimed is:

1. A method of blocking a telecommunication by a call blocking service provider for a plurality of subscribers, comprising:
   providing a software run on a computer of a subscriber of the call blocking service provider, wherein the computer comprises a microprocessor and a memory;
   receiving the telecommunication from a third party at the computer via a telecommunications network, wherein data of the third party is stored on the memory of the computer;
   prompting the subscriber by the computer to provide a designation of whether the telecommunication is from a desired third party or an undesired third party;
   transmitting the data and the designation from the computer to a server of the call blocking service provider, the server comprising a microprocessor and a memory, wherein the microprocessor of the server:
   stores the data of the third party on the memory of the server;
   matches the data of the third party from the computer of the subscriber with other data of the third party received from other computers of other subscribers;
   counts a total amount of telecommunications the third party has made to the subscriber and other subscribers;
   counts a number of times the third party has been designated as the undesired third party from subscribers;
   transmits the total amount of telecommunications to the computer of the subscriber and the number of times that the third party has been identified as the undesired third party, wherein the microprocessor of the computer of the subscriber:
   compares the total amount of telecommunications and the number of times that the third party has been identified as the undesired third party, with a threshold amount;
   conveys the telecommunication to the subscriber if the total amount of telecommunications is below the threshold amount for each of the total amount of telecommunications and the number of times that the third party has been identified as the undesired third party, or blocks the telecommunication if the total amount of telecommunications is above the threshold amount;
   receiving a second telecommunication at a second computer of a second subscriber via the telecommunications network from the third party, wherein the microprocessor of the server:
   transmits the number of times the third party has been communicated as undesirable to the second computer of the second subscriber, wherein a microprocessor of the second computer:

compares the second telecommunication with a contacts list of the second subscriber;

compares the number of times the third party has been designated as undesirable to a second threshold amount; and conveys the second telecommunication to the second subscriber if the number of times is equal to or below the second threshold amount and the telecommunication is on the contacts list, or blocks the telecommunication if the number of times is above the second threshold amount.

2. The method of claim 1, wherein the threshold amount is set by the subscriber and saved on the memory of the computer.

3. The method of claim 2, wherein the telecommunications network is a wireless telecommunications network.

4. The method of claim 3, wherein the step of transmitting the data from the computer to the server is performed over the wireless telecommunications network.

5. The method of claim 4, wherein the microprocessor of the server transmits the total amount of telecommunications to the computer of the subscriber over the wireless telecommunications network.

6. The method of claim 1, wherein the data comprises at least one of a phone number, a name, a computer identification, and a network address.

7. The method of claim 1, wherein the telecommunication is at least one of a telephone call, an email and a text message.

8. The method of claim 7, wherein the telecommunication is a telephone call and wherein the computer is operatively connected to a subscriber phone.

9. The method of claim 8, wherein the computer and the subscriber phone are part of a mobile device, wherein the software is a blocking application provided for installation on the mobile device.

10. The method of claim 1, wherein the microprocessor of the computer blocks the telecommunication if the total amount is above the threshold amount.

11. A method of handling a telecommunication by a call handling service provider for a plurality of subscribers, comprising:

providing a software run on a computer of a subscriber to the call handling service provider, wherein the computer comprises a microprocessor and a memory;

receiving the telecommunication at the computer via a telecommunications network from a third party, wherein data of the third party is stored on the memory of the computer;

prompting the subscriber by the computer to provide a designation of whether the telecommunication is from a desired third party or an undesired third party;

transmitting the data and the designation from the computer to a server of the call handling service, the server comprising a microprocessor and a memory, wherein the microprocessor of the server:

stores the data of the third party on the memory of the server; matches the data of the third party from the computer of the subscriber with other data of the third party received from other computers of other subscribers;

counts a total amount of telecommunications the third party has made to subscribers and the number of times that the third party has been designated as the undesired third party; and transmits the total amount of telecommunications to the computer of the subscriber and the number of times that the third party has been designated as the undesired third party, wherein the microprocessor of the computer of the subscriber:

compares the total amount of telecommunications and the number of times that the third party has been designated as the undesired third party, with a threshold amount; and conveys the telecommunication to the subscriber if the total amount is below the threshold amount for each of the total amount of telecommunications and the number of times that the third party has been identified as the undesired third party, or handles the telecommunication according to a predetermined handling setting if the total amount is above the threshold amount:

receiving a second telecommunication at a second computer of a second subscriber via the telecommunications network from the third party, wherein the microprocessor of the server:

transmits the number of times the third party has been designated as the undesired third party to the second computer of the second subscriber, wherein a microprocessor of the second computer;

compares the second telecommunication with a contacts list of the second subscriber;

compares the number of times the third party has been designated as undesirable to a second threshold amount; and conveys the second telecommunication to the second subscriber if the number of times is equal to or below the second threshold amount and the telecommunication is on the contacts list, or handles the telecommunication according to the predetermined handling setting if the number of times is above the second threshold amount.

12. The method of claim 11, wherein the threshold amount is set by the subscriber and saved on the memory of the computer of the subscriber.

13. The method of claim 11, wherein the predetermined handling setting comprises one or more of hanging up the telecommunication, blocking the telecommunication, and playing a message to the telecommunication.

\* \* \* \* \*